US011164405B2

(12) United States Patent
Books et al.

(10) Patent No.: US 11,164,405 B2
(45) Date of Patent: Nov. 2, 2021

(54) METHODS TO IDENTIFY MISSED ENGINE STOPS AND SERVICEABILITY (71) Applicant: CUMMINS INC., Columbus, IN (US)

(72) Inventors: Martin T. Books, Columbus, IN (US); Praveen Chitradurga Muralidhar, Ann Arbor, MI (US); Jeffrey S. Rauch, Columbus, IN (US); Jon S. Wardlow, Columbus, IN (US)

(73) Assignee: Cummins Inc., Columbus, IN (US)

( * ) Notice: Subject to any disclaimer, the term of this patent is extended or adjusted under 35 U.S.C. 154(b) by 597 days.

(21) Appl. No.: 15/758,257

(22) PCT Filed: Sep. 9, 2015

(86) PCT No.: PCT/US2015/049139
§ 371 (c)(1),
(2) Date: Mar. 7, 2018

(87) PCT Pub. No.: WO2017/044088
PCT Pub. Date: Mar. 16, 2017

(65) Prior Publication Data
US 2018/0261024 A1 Sep. 13, 2018

(51) Int. Cl.
*G07C 5/08* (2006.01)
*F02N 11/08* (2006.01)

(52) U.S. Cl.
CPC ........ *G07C 5/0841* (2013.01); *F02N 11/0818* (2013.01); *F02N 11/0822* (2013.01);
(Continued)

(58) Field of Classification Search
CPC ... Y02T 10/48; F02N 11/0818; F02N 11/0825
See application file for complete search history.

(56) References Cited

U.S. PATENT DOCUMENTS 5,491,631 A * 2/1996 Shirane ............... F02D 41/22
123/479
6,112,150 A * 8/2000 Irons .................. F02D 41/266
701/114
(Continued)

FOREIGN PATENT DOCUMENTS

CN  1834672 A   9/2006
CN  104603431 A  5/2015
(Continued)

OTHER PUBLICATIONS

International Search Report and Written Opinion dated Dec. 14, 2015.
(Continued)

*Primary Examiner* — Thomas G Black
*Assistant Examiner* — Ana D Thomas
(74) *Attorney, Agent, or Firm* — Faegre Drinker Biddle & Reath LLP (57) ABSTRACT The present disclosure provides a method in a vehicle, comprising detecting an engine stop opportunity and recording, in a memory, data corresponding to a first engine stop that occurred in response to detection of the engine stop opportunity. The method further includes detecting an engine stop inhibit, and recording, in a memory, data corresponding to a first missed engine stop wherein the first missed engine stop indicates detection of the engine stop opportunity without an engine stop in response to the detection of the engine stop opportunity.

27 Claims, 5 Drawing Sheets (52) U.S. Cl.
CPC ..... *F02N 11/0825* (2013.01); *F02N 2200/022* (2013.01); *F02N 2200/023* (2013.01); *F02N 2200/061* (2013.01); *F02N 2200/063* (2013.01); *F02N 2200/064* (2013.01); *F02N 2200/0801* (2013.01); *F02N 2200/0802* (2013.01); *F02N 2200/0804* (2013.01); *F02N 2200/0805* (2013.01); *F02N 2200/0812* (2013.01); *F02N 2200/0814* (2013.01); *F02N 2200/0815* (2013.01); *F02N 2200/101* (2013.01); *F02N 2200/102* (2013.01); *F02N 2300/30* (2013.01); *Y02T 10/40* (2013.01)

(56) References Cited

U.S. PATENT DOCUMENTS

| | | | |
|---|---|---|---|
| 8,494,711 | B2 | 7/2013 | Tiwari et al. |
| 2004/0043868 | A1 | 3/2004 | Ewinger et al. |
| 2006/0208568 | A1* | 9/2006 | Kaita .................. F02D 41/221 307/9.1 |
| 2012/0077640 | A1 | 3/2012 | Saito et al. |
| 2013/0245925 | A1* | 9/2013 | Malone ............... F02N 11/0818 701/113 |
| 2014/0032037 | A1* | 1/2014 | Lott .................... F02N 11/108 701/29.2 |
| 2014/0100727 | A1* | 4/2014 | Pietron ................ B60W 20/40 701/22 |
| 2015/0211468 | A1 | 7/2015 | Ezumi et al. |

FOREIGN PATENT DOCUMENTS

| | | |
|---|---|---|
| CN | 104791112 A | 7/2015 |
| JP | 2014-047637 | 3/2014 |

OTHER PUBLICATIONS

International Preliminary Report on Patentability dated Oct. 10, 2017.

* cited by examiner

FIG. 5

METHODS TO IDENTIFY MISSED ENGINE STOPS AND SERVICEABILITY

CROSS-REFERENCE TO RELATED APPLICATION

This application is a national phase filing of PCT International Application Serial No. PCT/US2015/049139, filed Sep. 9, 2015, the disclosure of which is expressly incorporated herein by reference.

FIELD OF THE DISCLOSURE

The present disclosure generally relates to diagnostic systems for internal combustion engines, and more specifically to a method for identifying missed engine stops that includes writing, to a memory, the total engine stops missed over a predetermined time period and utilizing this information to facilitate diagnosis and correction of one or more engine service issues.

BACKGROUND OF THE DISCLOSURE

A vehicle may include an auto-stop/start system that increases the vehicle's fuel efficiency. The auto-stop/start system increases fuel efficiency by selectively shutting down the engine and disabling the provision of fuel to the engine while the vehicle ignition system is activated. While the engine is shut down, the auto-stop/start system selectively starts up the engine when one or more start-up conditions are satisfied. Systems for diagnosing engine components based on the behavior of such components are known and have been implemented extensively in the automotive and diesel engine industries. However, with such conventional diagnostic approaches, it is difficult to diagnose some system fault conditions associated with a variety of vehicle and engine control systems that preclude engine stop occurrences in, for example, hybrid and non-hybrid vehicles. Accordingly, it is desirable to develop a diagnostic system and method that includes a fault identification methodology that allows for the identification of missed engine stops so as to improve vehicle serviceability.

SUMMARY OF THE DISCLOSURE

In one embodiment of the present disclosure, a method of operating a vehicle is provided comprising detecting, by an engine stop opportunity determiner, an engine stop opportunity; determining, by the engine stop inhibit determiner, that an engine stop did not occur in response to the detected engine stop opportunity; identifying, by the engine stop inhibit determiner, an engine stop inhibit reason that prevented the engine stop from occurring in response to the detected engine stop opportunity; and writing, to a memory, the engine stop inhibit reason. In one aspect of this embodiment, determining that an engine stop did not occur in response to the detected engine stop opportunity indicates a missed engine stop, and the method further includes incrementing a missed engine stop count in response to determining that a missed engine stop occurred. In another aspect, the method further includes incrementing an engine stop count in response to determining that an engine stop occurred in response to detecting the engine stop opportunity. In yet another aspect, the method further includes detecting an engine stop inhibit and incrementing an engine stop inhibit count in response to detection of the engine stop inhibit.

In another embodiment of the present disclosure, a method in a vehicle is provided comprising detecting, by an engine stop opportunity determiner, an engine stop opportunity; writing, to a memory, data corresponding to a first engine stop that occurred in response to detection of the engine stop opportunity; detecting, by an engine stop inhibit determiner, an engine stop inhibit; and writing, to a memory, data corresponding to a first missed engine stop wherein the first missed engine stop indicates detection of the engine stop opportunity without an engine stop in response to the detection of the engine stop opportunity. In one aspect of this embodiment, the method further includes incrementing an engine stop count in response to determining that an engine stop occurred, incrementing an engine stop inhibit count in response to detection of an engine stop inhibit, and incrementing a missed engine stop count in response to determining that a missed engine stop occurred. In another aspect, the method further includes writing, to a memory, data corresponding to detection of the engine stop opportunity and detection of the engine stop inhibit. In yet another aspect, detecting an engine stop inhibit includes detecting one or more causes for the engine stop inhibit. In a variant of this aspect, the one or more causes for the engine stop inhibit include at least one of a hybrid system cause, an after-treatment system cause, an engine system cause, an energy storage and battery system cause, a vehicle and machine system cause, or an operator controlled and external system cause.

In yet another aspect, detecting an engine stop opportunity includes detecting that the vehicle speed is below a threshold speed, a transmission of the vehicle is engaged in a gear ratio that permits movement of the vehicle, an accelerator pedal of the vehicle is not engaged, and at least one of a parking brake of the vehicle is engaged or a friction break of the vehicle is engaged. In yet another aspect, the method further includes writing, to the memory, a total number of engine stop opportunities for a first time period, a total number of engine stops for the first time period, a total number of missed engine stops for the first time period; and a total number of missed engine stops that occur in response to the engine stop inhibit and the corresponding engine stop inhibit cause. In a variant of this aspect, the memory comprises one or more non-volatile memory sectors configured to retain data while the memory is in a power down state. In yet another aspect, the method further includes determining that an engine stop occurred in response to detection of the engine stop opportunity. In yet another aspect, the method further includes determining that a missed engine stop occurred in response to detection of the engine stop opportunity and detection of the engine stop inhibit. In a variant of this aspect, the method further includes detecting at least one of a vehicle system fault or a vehicle system condition in response to at least one of detecting the engine stop inhibit or determining that a missed engine stop occurred.

In yet another embodiment of the present disclosure, a method is provided comprising commanding a first circuit to detect an engine stop opportunity and to determine that an engine stop occurred; commanding the first circuit to write engine stop data to a memory, the data corresponding to an occurrence of a first engine stop; commanding a second circuit to detect an engine stop inhibit and to determine that a missed engine stop occurred; commanding the second circuit to write engine stop inhibit data to a memory, the data corresponding to an occurrence of a first missed engine stop; and detecting, by a controller, at least one of a vehicle system fault or a vehicle system condition in response to at least one of detecting the engine stop inhibit or determining that a missed engine stop occurred. In one aspect of this embodiment, the method further includes incrementing an engine stop count in response to determining that an engine stop occurred, incrementing an engine stop inhibit count in response to detection of an engine stop inhibit, and incrementing a missed engine stop count in response to determining that a missed engine stop occurred.

In yet another aspect, the method further includes writing, to the memory, data corresponding to detection of the engine stop opportunity and detection of the engine stop inhibit. In yet another aspect, the method further includes writing, to the memory, at least one of a total number of engine stop opportunities for a first time period, a total number of engine stops for the first time period, a total number of missed engine stops for the first time period; and a total number of missed engine stops that occur in response to the engine stop inhibit. In yet another aspect, detecting an engine stop inhibit includes detecting one or more causes for the engine stop inhibit. In a variant of this aspect, the one or more causes for the engine stop inhibit include at least one of a hybrid system cause, an after-treatment system cause, an engine system cause, an energy storage and battery system cause, a vehicle and machine system cause, or an operator controlled and external system cause. In a variant of this variant, the method further includes writing, to the memory, a total number of engine stop inhibits for the first time period and the corresponding engine stop inhibit cause. In yet another aspect, a missed engine stop indicates detection of the engine stop opportunity without an engine stop in response to the detection of the engine stop opportunity. In yet another aspect, the first circuit is an engine stop opportunity determiner and the second circuit is an engine stop inhibit determiner and the controller includes one or more interpreter circuits configured to detect at least one of the vehicle system fault or the vehicle system condition.

In another embodiment of the present disclosure, an apparatus is provided comprising a controller including a first interface configured to receive one or more data signals that indicate an engine stop opportunity; a second interface configured to receive one or more parameter signals that indicate an engine stop inhibit; memory configured to store data corresponding to a first engine stop opportunity, a first engine stop inhibit and a first missed engine stop; and logic configured to monitor the parameter signals and the one or more data signals, to determine that an engine stop occurred in response to the indication of an engine stop opportunity, and to determine that a missed engine stop occurred in response to the indication of the engine stop opportunity and indication of the engine stop inhibit. In one aspect of this embodiment, the logic increments an engine stop count in response to determining that an engine stop occurred, increments an engine stop inhibit count in response to receiving indication of an engine stop inhibit, and increments a missed engine stop count in response to determining that a missed engine stop occurred. In another aspect, receiving one or more parameter signals that indicate an engine stop inhibit includes receiving an indication of the one or more causes for the engine stop inhibit.

In a variant of this aspect, the one or more causes for the engine stop inhibit include at least one of a hybrid system cause, an after-treatment system cause, an engine system cause, an energy storage and battery system cause, a vehicle and machine system cause, or an operator controlled and external system cause. In a variant of this variant, the logic is further configured to write data to the memory, the data indicating at least one of a total number of engine stop opportunities for a first time period, a total number of engine stops for the first time period, a total number of missed engine stops for the first time period, or a total number of missed engine stops that occur in response to the engine stop inhibit. In a variant of this variant, the logic is further configured to write data to the memory, the data indicating a total number of engine stop inhibits for the first time period and the corresponding engine stop inhibit cause. In yet another aspect, the logic detects an engine stop opportunity in response to receiving one or more data signals that indicate at least one of a vehicle speed is below a threshold speed, a transmission of the vehicle is engaged in a gear ratio that permits movement of the vehicle, an accelerator pedal of the vehicle is not engaged, and at least one of a parking brake of the vehicle is engaged or a friction break of the vehicle is engaged.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION OF EMBODIMENTS

The embodiments disclosed herein are not intended to be exhaustive or to limit the disclosure to the precise forms disclosed in the following detailed description. Rather, the embodiments were chosen and described so that others skilled in the art may utilize their teachings.

Figure 1:
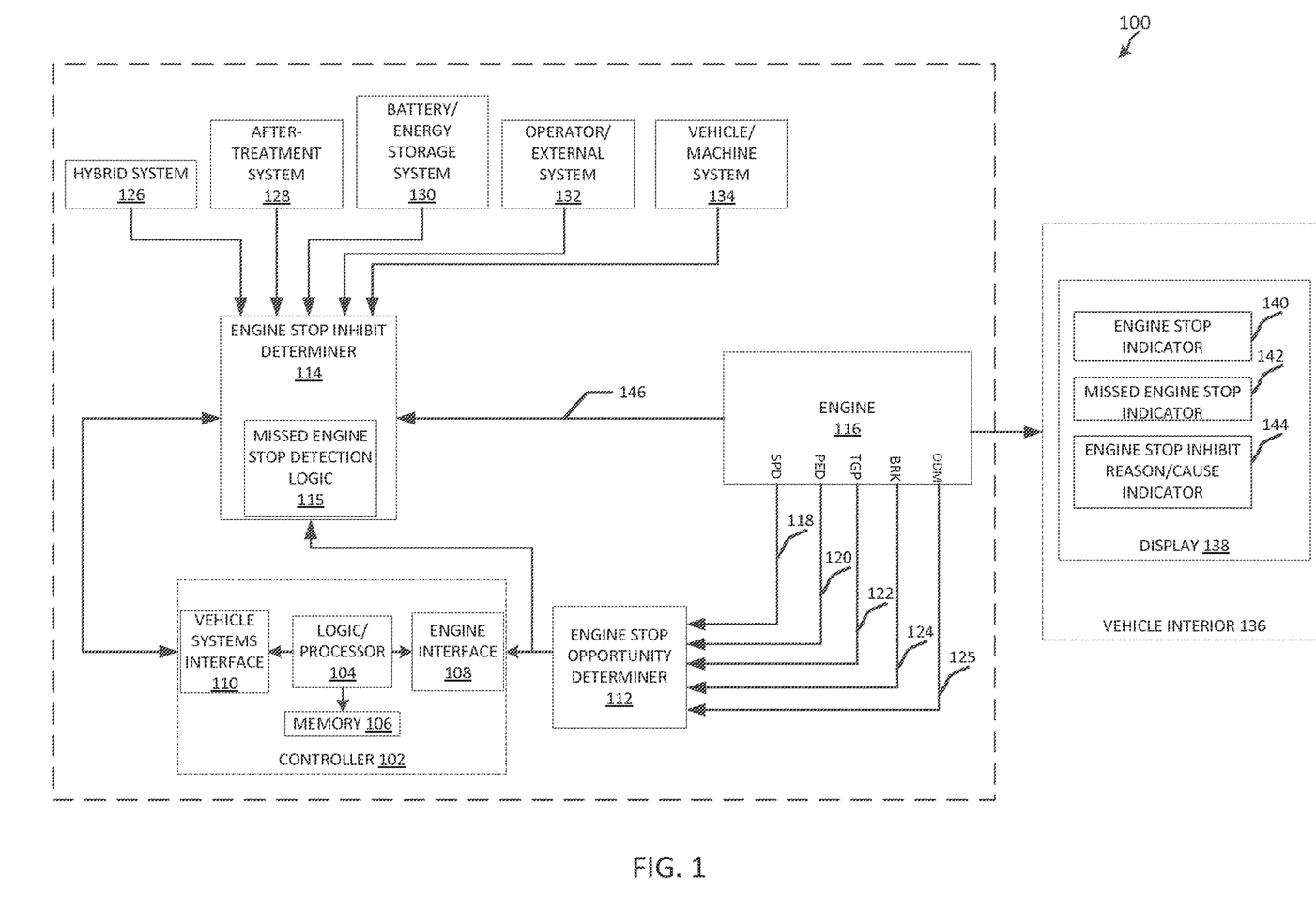
FIG. 1 is block diagram of an engine stop/start detection system according to an embodiment of the present disclosure.

Referring now to FIG. 1, a block diagram of an engine stop/start detection system 100 according to an embodiment of the present disclosure is shown. The following description is merely exemplary in nature and is in no way intended to limit the disclosure, its application, or uses. As used herein, the phrase at least one of A, B, or C should be construed to mean a logical (A or B or C), using a non-exclusive logical OR. It should be understood that steps within a method may be executed in a different order without altering the principles of the present disclosure. As used herein, the term determiner, or interpreter may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

As shown in the illustrative embodiment of FIG. 1, system 100 includes a controller 102, engine stop opportunity ("ESO") determiner 112, engine stop inhibit ("ESI") determiner 114, internal combustion engine 116, and vehicle interior 136. In certain embodiments, controller 102 forms a portion of a processing subsystem including one or more computing devices having memory, processing, and communication hardware. Controller 102 may be a single device or a distributed device, and the functions of the controller may be performed by hardware and/or as computer instructions on a non-transient computer readable storage medium. Vehicle interior 136 generally comprises a display 138 that is viewable by the operator and that includes one or more indicators such as engine stop indicator 140, missed engine stop indicator 142, and engine stop inhibit reason/cause indicator 144. As is generally known in the art, engine 116 combusts an air/fuel mixture to produce drive torque for a vehicle. Torque output by engine 116 is selectively transferred to a transmission (not shown) via a torque transfer device (not shown). More specifically, the torque transfer device selectively couples the transmission to engine 116 and de-couples the transmission 122 from engine 116. The transmission may include, for example, a manual transmission, an automatic transmission, a semi-automatic transmission, an auto-manual transmission, or another suitable type of transmission.

System 100 further includes hybrid system 126, aftertreatment system 128, battery/energy storage system 130, operator/external system 132, and vehicle/machine system 134. Controller 102 generally includes logic/processor 104, memory 106, engine interface 108, and vehicle systems interface 110. In one embodiment, logic/processor 104 of controller 102 is a microprocessor that includes one or more control algorithms or logic that is generally operable to control and manage the overall operation of engine 116 and the plurality of aforementioned sub-systems that comprise system 100. In one embodiment, processor 104 may include one or more microprocessors, microcontrollers, digital signal processors (DSPs), combinations thereof and/or such other devices known to those having ordinary skill in the art that may be configured to process one or more data and/or parameter signals to provide one or more control signals.

In certain embodiments, controller 102 includes one or more interpreters such as for example engine interface 108 and vehicle systems interface 110 and one or more determiners such as, for example, processor 104 that functionally executes the operations of the controller. The description herein including interpreters and determiners emphasizes the structural independence of certain aspects of the controller 102, and illustrates one grouping of operations and responsibilities of the controller. Other groupings that execute similar overall operations are understood within the scope of the present disclosure. Interpreters and determiners may be implemented in hardware and/or as computer instructions on a non-transient computer readable storage medium, and may be distributed across various hardware or computer based components. Example and non-limiting implementation elements that functionally execute the operations of the controller include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to a specification, any actuator including at least an electrical, hydraulic, or pneumatic actuator, a solenoid, an op-amp, analog control elements (springs, filters, integrators, adders, dividers, gain elements), and/or digital control elements.

Controller 102 may include a number of inputs and outputs for interfacing with various sensors and systems coupled to engine 116. In one embodiment, controller 102 may be a known control unit customarily referred to by those of ordinary skill as an electronic or engine control module (ECM), electronic or engine control unit (ECU) or the like, or may alternatively be a control circuit capable of operation as will be described herein. In one embodiment, memory 106 includes random access memory (RAM), dynamic random access memory (DRAM), and/or read only memory (ROM) or equivalents thereof, that store data and programs that may be executed by processor 104 and allow controller 102 to communicate with the above-mentioned components to cause system 100 to perform the functionality described herein. In one embodiment, at least one sector of memory 106 may be comprised of one or more non-volatile memory sectors that are configured to retain data while memory 106 is in a powered down state.

Engine interface 108 and ESO determiner 112 may comprise a plurality of electronic components configured to receive analogue or digital input signals from a plurality of sensors coupled to engine 116. Engine interface 108 may, for example, convert an analog voltage value provided by ESO determiner 112 to a corresponding digital signal that is received by controller 102 such that commands may be provided in response to the value assigned to the digital signal. Likewise, vehicle systems interface 110 and ESI determiner 114 may also comprise a plurality of electronic components configured to receive parameter signals and to provide voltage and/or current values to, for example, detect the occurrence of an engine stop inhibit, determine that a missed engine stop occurred in response to execution of missed engine stop detection ("ESD") logic 115.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Engine 116 may include one or more sensors configured to provide one or more parameter signals such as engine speed ("SPD") sensor 118, throttle/pedal position ("PED") sensor 120, transmission gear position ("TGP") sensor 122, brake engaged ("BRK") sensor 124, and engine odometer ("ODM") sensor 125. In one embodiment, SPD sensor 118 may be electrically coupled to an input of ESO determiner 112. In an alternate embodiment, SPD sensor 118 may be coupled directly to engine interface 108. In one embodiment, SPD sensor 118 may be a conventional sensor configured to produce a signal from which the rotational speed of engine 116 can be determined and, in certain embodiments, from which the rotational position, i.e., the crank angle, of the engine 116 relative to a reference position or reference crank angle can be determined. In this embodiment, processor 104 and/or memory 106 may include instructions that are executable by controller 102 to process data signals produced by SPD sensor 118 to determine the rotational speed of the engine, for example, in rotations per minute (RPM). In one embodiment, SPD sensor 118 may be a conventional Hall Effect sensor configured for speed detection, although other conventional sensors may alternatively be used.

In one embodiment, PED sensor 120 may be electrically coupled to an input of ESO determiner 112. In an alternate embodiment, PED sensor 120 may be coupled directly to engine interface 108. In one embodiment, PED sensor 120 may be a conventional valve position sensor configured to produce a signal indicative of the position of an exemplary throttle valve coupled to engine 116. In this embodiment, processor 104 and/or memory 106 may include instructions that are executable by controller 102 to process data signals produced by PED sensor 120 to monitor the throttle valve position relative to a reference position. In one embodiment, PED sensor 120 may also be referred to as an accelerator pedal position sensor configured for pedal position measurement relative to a reference position and to produce one or more signals indicative of the measured pedal position.

In one embodiment, TGP sensor 122 may be electrically coupled to an input of ESO determiner 112. In an alternate embodiment, TGP sensor 122 may be coupled directly to engine interface 108. In one embodiment, TGP sensor 122 may be a conventional gear position sensor configured to produce a signal indicative of the position of an exemplary gearshift position of a transmission of engine 116. In this embodiment, processor 104 and/or memory 106 may include instructions that are executable by controller 102 to process data signals produced by TGP sensor 120 to monitor the actual gear shift position as an operator moves the gearshift from, for example, "neutral" to a transmission gear position that permits accelerating movement of the vehicle in response to an increase in applied engine throttle.

In one embodiment, BRK sensor 124 may be electrically coupled to an input of ESO determiner 112. In an alternate embodiment, BRK sensor 124 may be coupled directly to engine interface 108. In one embodiment, BRK sensor 124 may be a conventional brake pedal position sensor configured to produce a signal indicative of the position or activation state of an exemplary brake pedal associated with vehicle interior 136. In this embodiment, processor 104 and/or memory 106 may include instructions that are executable by controller 102 to process data signals produced by BRK sensor 124 to monitor the actual brake pedal position as an operator engages/depresses, for example, a conventional friction brake accessible within vehicle interior 136. In one embodiment, BRK sensor 124 may be a conventional electromechanical sensor configured to sense brake pedal motion, although other conventional sensors may alternatively be used.

In one embodiment, ODM sensor 125 may be electrically coupled to an input of ESO determiner 112. In an alternate embodiment, ODM sensor 125 may be coupled directly to engine interface 108. In one embodiment, ODM sensor 125 may be a conventional engine odometer sensor configured to produce a signal indicative of the measured distance traveled by a vehicle. In this embodiment, processor 104 and/or memory 106 may include instructions that are executable by controller 102 to process data signals produced by ODM sensor 125 to monitor the actual distance traveled by the vehicle.

As shown in the illustrative embodiment of FIG. 1, system 100 comprises a plurality of vehicle sub-systems that may include a plurality of electronic circuits and/or sensors configured to provide parameter signals corresponding to at least one of a system fault or a system condition. In one embodiment, an exemplary vehicle of the present disclosure includes engine 116 and may also generally include at least one of hybrid control system 126, after-treatment system 128, battery/energy storage system 130, operator/external system 132, or vehicle/machine system 134. In one embodiment, hybrid control system 126 is a conventional hybrid system generally known in the art and may include, for example, one or more electric drive components such as a motor/generator and a plurality of power electronics circuits that exchange data communications between hybrid system 126 and various other systems of the exemplary vehicle. While a hybrid control system 126 is described in an exemplary embodiment, it should be understood that the teachings of the present disclosure are equally applicable to non-hybrid vehicles.

In this embodiment, after-treatment system 128 is a conventional after-treatment system generally known in the art and may include, for example, exhaust after-treatment devices such as an oxidation catalyst and/or a particulate filter that are configured to engage in one or more temperature managed operations as well as exchange data communications between after-treatment system 128 and various other systems of the exemplary vehicle. In this embodiment, battery/energy storage system 130 is a conventional battery system generally known in the art and may include, for example, a battery charge sensing system configured to detect battery charge above and/or below a threshold charge and a battery temperature sensing system configured to detect battery temperatures above and/or below threshold temperatures. Battery system 130 may further include one or more electronic circuits configured to exchange data communications between battery system 130 and various other systems of the exemplary vehicle.

Additionally, in this embodiment, operator/external system 132 is a conventional operator system generally known in the art and may include, for example, a manual operator controlled Engine Stop/Start Inhibit Switch moveable between an "ON" position in which automatic engine stops do not occur and an "OFF" position in which automatic engine stops do occur. Operator/external system 132 may further include a vehicle interlock system having an active and an inactive state wherein the system is configured to be in an active state when, for example, a vehicle door/entrance is open, an engine access means (e.g. vehicle hood/bonnet) is open, a vehicle cabin temperature management system is engaged in a particular operation. Likewise, the operator system 132 may be in an inactive state when the entrance and/or engine access means is closed and/or the temperature management system is not engaged in a particular operation. In this embodiment, vehicle/machine system 134 is a conventional vehicle/machine system generally known in the art and may include, for example, a vehicle power-take-off system configured to transfer mechanical power from engine 116 or a related system to another piece of equipment or machine. Vehicle/machine system 134 may further include one or more sensors that cooperate to trigger an automatic engine stop opportunity (e.g. SPD sensor 118, PED sensor 120, TGP sensor 122, and BRK sensor 124) as well as a conventional anti-lock braking system and one or more electronic circuits configured to exchange data communications between vehicle/machine system 134 and various other systems of the exemplary vehicle.

In vehicles equipped with stop/start technology, logic/processor 104 may execute a vehicle shutdown command and controller 102 may selectively provide control signals to activate an engine stop or engine shut down event only when certain vehicle conditions are satisfied. In one embodiment, at a vehicle stop, engine 116 may be shut down and subsequently restarted when the driver/operator commands an engine restart, either by depressing an accelerator pedal/engine throttle or by releasing the brake pedal. However, not every vehicle stop will be accompanied by an engine shutdown. As discussed in more detail in the disclosed embodiment of FIG. 5, there may be multiple reasons or causes preventing the engine from stopping or shutting down, including causes such as: 1) the duration of an exemplary vehicle stop may be sufficiently short so that the engine may not have an opportunity to shut down; 2) some hardware protective limit may have disabled automatic engine stop/shutdown; 3) a vehicle-installed device (e.g. a transmission) may have inhibited the engine stop/shutdown; 4) the driver/operator's actions may have prevented the engine stop/shutdown; or 5) the vehicle may not have traveled a sufficient distance since the last engine stop/shutdown.

Presently, during operation of vehicles equipped with prior art engine stop/start technology it is likely that the vehicle operator might be expecting the engine to shut down and when an engine shutdown does not occur the operator may have no indication of the missed engine stop nor will the operator have any indication of the one or more causes/reasons for the missed engine stop. In these prior art systems the apparent inconsistency regarding engine stop/start performance may lead to operator dissatisfaction with the vehicle's performance as performance and/or customer warranty complaints. Moreover, if intermittent engine stop/start performance is frequent, the inconsistent system functionality may negatively impact a vehicle's expected fuel efficiency profile. Accordingly system 100 provides a method and apparatus that maintains a stop/start history of engine 116 by categorizing one or more engine stop inhibit causes and recording/writing, in memory 106, a total number of missed engine stops and a total number of engine stop inhibit events that correspond to a particular engine stop inhibit category. More particularly, in one embodiment, system 100 maintains the following: 1) a total number of stops/restarts for engine 116 ("Successful Stop/start Counter"); 2) a total number of missed engine stops ("Missed Engine Stop Counter"); and 3) a sub-totaled number of missed engine stops associated with a particular engine stop inhibit category. In this embodiment, system 100 records/writes the data to at least one non-volatile memory sector of memory 106 within controller 102.

Figure 2:
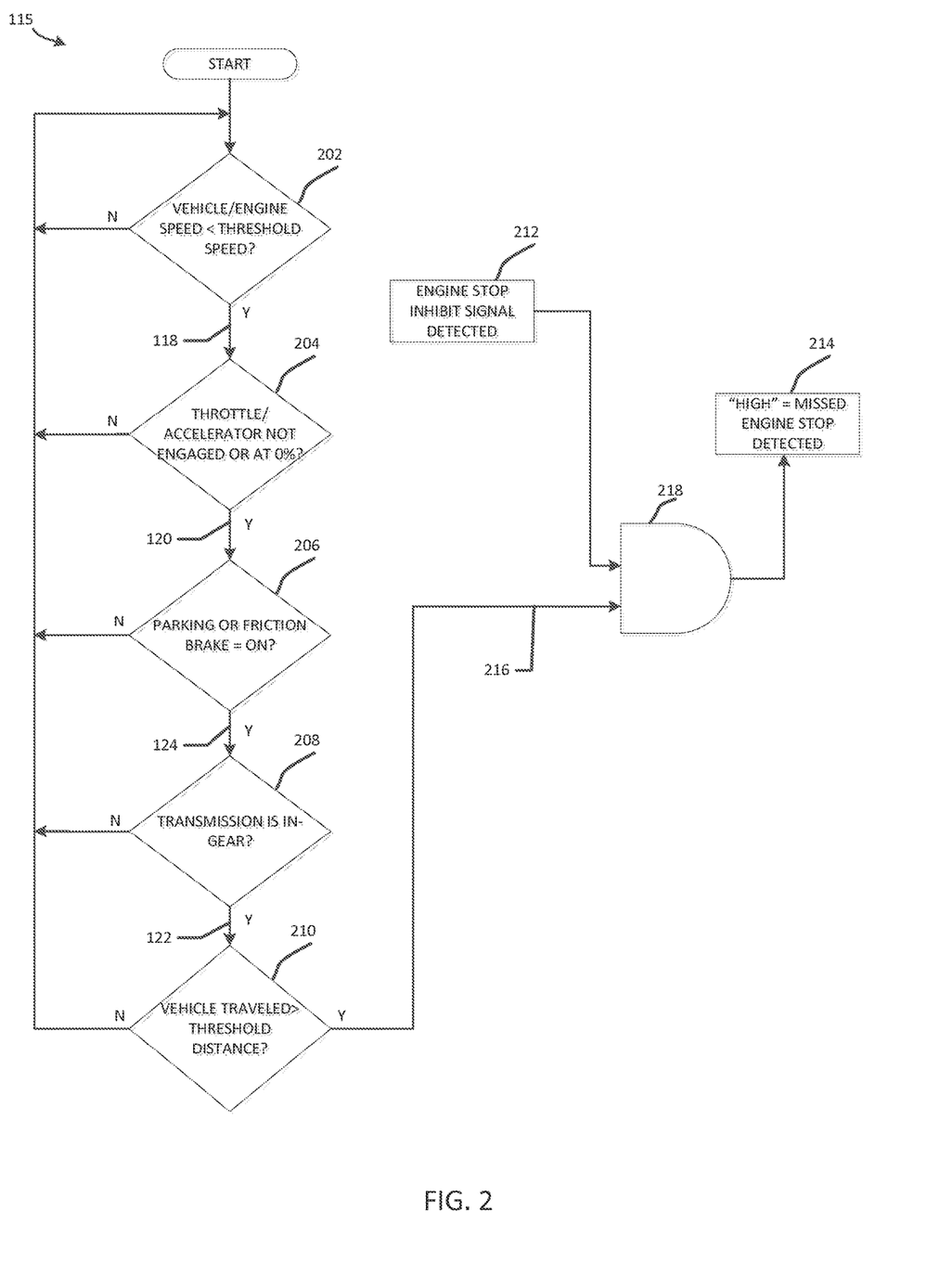
FIG. 2 is block diagram of a missed engine stop detection logic according to an embodiment of the present disclosure.

The illustrative embodiment of FIG. 2 is a block diagram of missed engine stop detection logic 115 according to an embodiment of the present disclosure. Logic 115 includes a plurality of decision blocks that comprise the steps for detecting an engine stop opportunity and for determining that a first missed engine stop occurred. In one embodiment, controller 102 identifies an engine stop opportunity when one or more sensors and/or circuits of system 100 provide one or more signals indicating that all of the following are true: 1) an engine/vehicle speed is below a threshold speed, 2) a transmission of the vehicle is engaged in a gear ratio that permits movement of the vehicle, 3) a throttle/accelerator pedal of the vehicle is not engaged or is at 0%, 4) at least one of a parking brake of the vehicle is engaged or a friction break of the vehicle is engaged, and 5) the vehicle has traveled a distance that is greater than a threshold distance. Accordingly, logic 115 includes vehicle/engine speed decision block 202, throttle/accelerator pedal position decision block 204, parking/friction brake decision block 206, transmission-in-gear decision block 208, and vehicle travel distance decision block 210. Logic 115 further includes logic interpreter 218 configured to receive decision input signals and provide an output signal indicative of a first missed engine stop. In one embodiment, interpreter 218 receives a first input signal 216 that is indicative of an engine stop opportunity and a second input signal 212 that is indicative of a detected engine stop inhibit. In one embodiment, signal 212 and signal 216 may be analog signals or digital signals having a "high" or "low" value.

In one embodiment, system 100 may detect an engine stop opportunity by way of logic 115. As shown in the illustrative embodiment of FIG. 2, logic 115 begins at block 202 and determines whether the vehicle/engine speed is below a threshold vehicle/engine speed. In one embodiment, the threshold speed may be between 1 mile per hour ("MPH") and 5 MPH. If the vehicle speed is not less than the threshold speed then logic 115 exits block 202 and returns to the start of the logic steps. If the vehicle speed is less than the threshold speed, then logic 115 determines (at block 204) whether the throttle/accelerator pedal is not engaged and/or is at a 0% position relative to a reference position. If the throttle/accelerator is engaged then logic 115 exits block 204 and returns to the start of the logic steps. If the throttle/accelerator is not engaged then logic 115 further includes block 206. At block 206 logic 115 determines whether at least one of a parking brake or friction brake of the vehicle is engaged or on. If at least one of the parking brake or friction brake is not engaged/on then logic 115 exits block 206 and returns to the start of the logic steps. If at least one of the parking brake or friction brake is engaged/on then logic 115 determines (at block 208) whether the transmission of the vehicle is engaged in a gear that permits movement of the vehicle. If the transmission is not engaged in gear that permits vehicle movement then logic 115 exits block 208 and returns to the start of the logic steps. If the transmission of the vehicle is engaged in a gear that permits movement of the vehicle then logic 115 determines (at block 210) whether the vehicle has traveled a distance that is greater than a threshold distance since the vehicle last stopped. Such distance criteria avoids annoying engine shutdowns in heavy stop-and-go traffic. In one embodiment, the threshold distance may be between 1 yard and 50 yards. If the vehicle has not traveled a distance that is greater than a threshold distance then logic 115 exits block 210 and returns to the start of the logic steps. If the vehicle has traveled a distance that is greater than a threshold distance then block 210 provides an output signal 216 indicative of an engine stop opportunity ("ESO").

ESO signal 216 is received as an input signal to interpreter 218. As discussed above, interpreter 218 receives ESO signal 216 and detected engine stop inhibit ("ESI") signal 212. In one embodiment of the present disclosure, system 100 logs one or more missed stops when ESO signal 216 is high/activated indicating the occurrence of an ESO and when ESI signal 212 is high/activated indicating the occurrence of an ESI caused by one or more of the above-mentioned engine sub-systems. State another way, interpreter 218 outputs a missed engine stop detected signal 214 when both ESO signal 216 is true (i.e., all conditions are "GO" for an engine stop) and ESI signal 212 is true (i.e., engine stop inhibit signal output by engine sub-system). In one embodiment, interpreter 218 is configured to output a signal having a high value wherein the signal is indicative of a detected missed engine stop 214. In this embodiment, missed engine stop indicator 142 viewable on display 138 may be electrically coupled to ESI signal 212 and may illuminate during operation of the vehicle to indicate to the driver/vehicle operator that a missed engine stop occurred. Likewise, in this embodiment, ESI reason/cause indicator 144 viewable on display 138 may be electrically coupled to ESI signal 212 and may illuminate during operation of the vehicle. In one embodiment, ESI signal 212 includes data parameters corresponding to the ESI reason/cause. Hence, in this embodiment, indicator 144 may not only indicate the occurrence of an ESI but may also indicate the one or more reasons/causes for the occurrence of the ESI.

Figure 3:
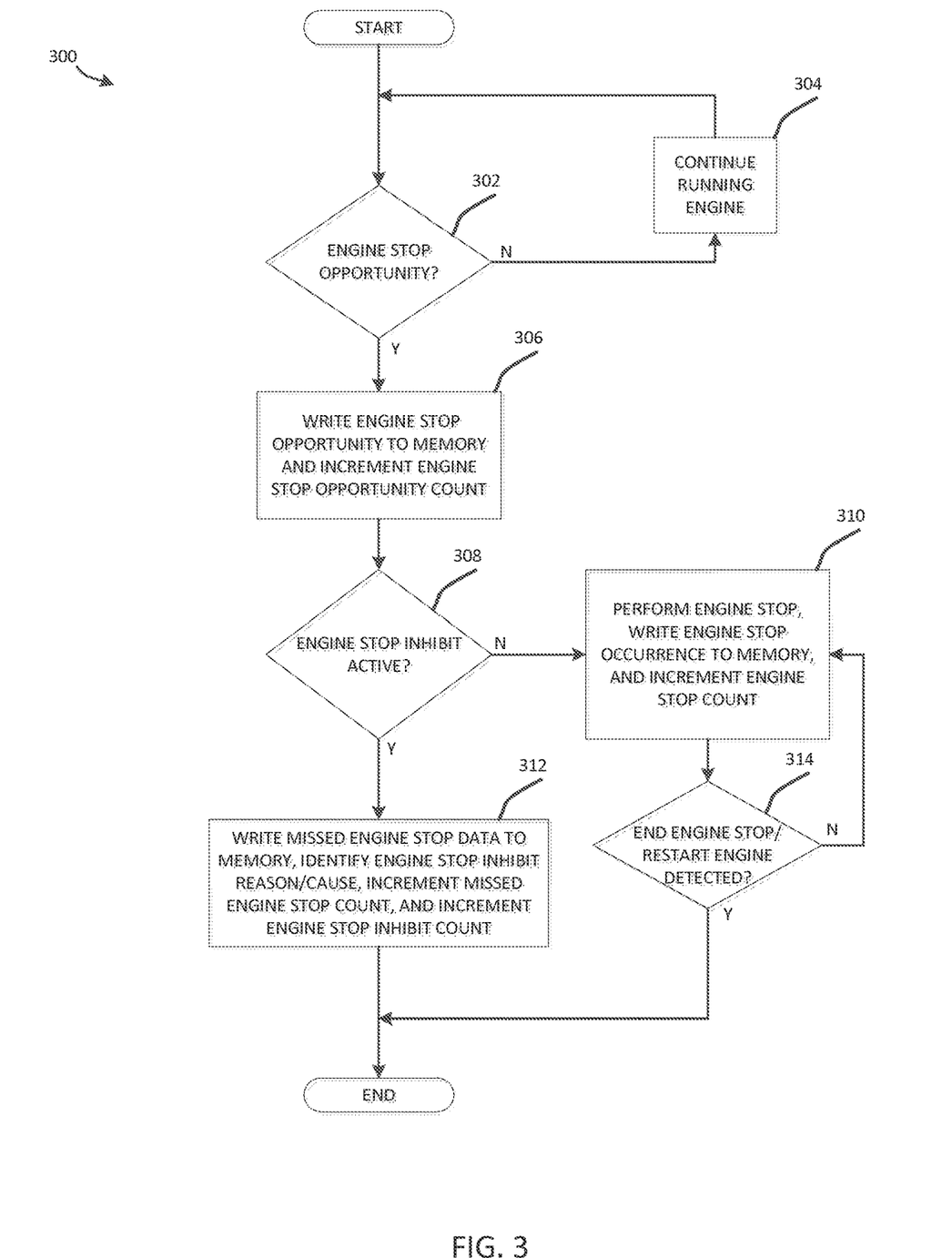
FIG. 3 depicts a flow diagram of an exemplary method of the engine stop/start detection system of FIG. 1 according to an embodiment of the present disclosure.

FIG. 3 depicts a flow diagram of an exemplary method 300 of the engine stop/start detection system 100 according to an embodiment of the present disclosure. In various embodiments of the present disclosure, method 300 may be implemented and/or executed in an exemplary vehicle comprising system 100. As such, a description of method 300 will reference the aforementioned components and subsystems of system 100. Method 300 begins at decision block 302 and determines whether there is an engine stop opportunity. As noted above in the disclosed embodiment of FIG. 2, ESO signal 216 of logic 115 may provide an indication of an ESO. If there is no ESO then method 300 continues normal operation of engine 116 as indicated by block 304. If there is an ESO then method 300 writes data (at block 306) corresponding to the occurrence of an ESO to memory 106 and increments an ESO count. In one embodiment, logic/processor 104 includes an incrementing or counting algorithm that increments the ESO count in response to the occurrence of an ESO. Controller 102 then writes/saves, to memory 106, a running total of each ESO occurrence.

After completing the steps of block 306, method 300 determines (at block 308) whether there is an active ESI. As noted above in the disclosed embodiment of FIG. 2, ESI signal 212 of logic 115 may provide an indication of an ESI. In one embodiment, each of the above-mention systems 126, 128, 130, 132, and 134 may provide one or more parameter signals to ESI determiner 114. As discussed in more detail herein below, the parameter signals may indicate a certain fault and/or condition associated with a particular vehicle sub-system. Accordingly, ESI determiner 114 may output ESI signal 212 in response to receiving one or more parameter signals indicating system faults and/or certain system conditions. Referring again to block 308, if method 300 determines that ESI is not active then controller 102 will cause engine 116 and associated systems to perform an engine stop for a first time period and write an engine stop occurrence to memory 106. In one embodiment, writing an engine stop occurrence to memory 106 includes writing a date and time of the engine stop occurrence. Additionally, logic/processor 104 will execute the counting algorithm and increment an engine stop count and controller 102 will write/save, to memory 106, a running total of each engine stop occurrence.

As is generally known in the art, the vehicle engine stop is typically performed only for a short time period defined by the start of the engine stop and receipt of a signal indicating that the engine stop should discontinue and that the engine should restart. As discussed above, in one embodiment, at a vehicle stop, engine 116 may be shut down and subsequently restarted when the driver/operator commands an engine restart, either by depressing an accelerator pedal/engine throttle or by releasing the brake pedal thereby causing controller 102 to provide an end engine stop and/or restart engine control signal to engine 116. At block 314 method 300 determines if system 100 has detected the end engine stop/restart engine signal. In one embodiment, the end engine stop/restart engine signal is detected by controller 102 when the driver/operator stops engaging the friction brake or depresses the throttle/accelerator of the vehicle. Method 300 ends upon detection of the end engine stop/restart engine signal. Referring again to block 308, if method 300 determines that ESI is active then method 300 writes data to memory 106 (at block 312) indicating the occurrence of a missed engine stop wherein the data includes the date and time of the missed engine stop occurrence. Step 312 also identifies an engine stop inhibit reason/cause, and increments both the missed engine stop count and engine stop inhibit count. In one embodiment, ESI determiner 114 may detect or identify the system fault or system condition responsible for the ESI occurrence. In this embodiment, controller 102 will write, to memory 106, a running total of each ESI occurrence, the corresponding reason/cause for the ESI occurrence and a running total of each missed engine stop. Method 300 ends after executing the steps of block 312.

Figure 4:
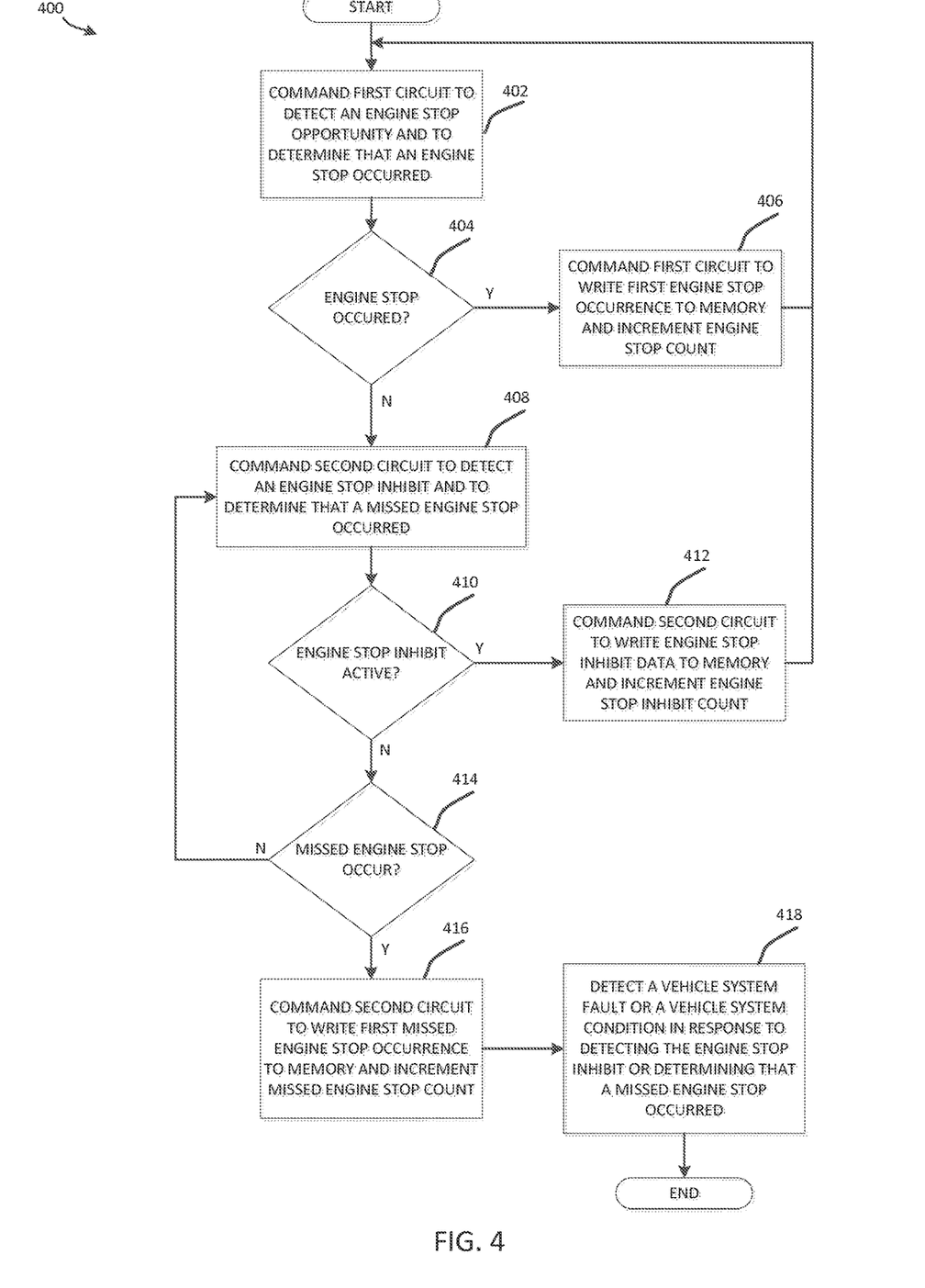
FIG. 4 depicts another flow diagram of an exemplary method of the engine stop/start detection system of FIG. 1 according to an embodiment of the present disclosure.

FIG. 4 depicts another flow diagram of an exemplary method 400 of the engine stop/start detection system 100 according to an embodiment of the present disclosure. In various embodiments, method 400 may be implemented and/or executed in an exemplary vehicle including system 100. As such, a description of method 400 may reference the aforementioned components and sub-systems of system 100. Method 400 begins at decision block 402 and commands a first circuit to detect an engine stop opportunity and to determine that an engine stop occurred. Method 400 further includes decision block 404 and determines if an engine stop occurred. If an engine stop did occur then method 400 commands (at block 406) the first circuit to write a first engine stop occurrence to memory 106 and increment the engine stop count. If an engine stop did not occur then method 400 commands (at block 408) a second circuit to detect an engine stop inhibit and to determine that a missed engine stop occurred.

Method 400 further includes block 410 which determines if the engine stop inhibit is active. If the engine stop inhibit is active then method 400 commands (at block 412) the second circuit to write engine stop inhibit data to memory 106 and to increment an engine stop inhibit count. If the engine stop inhibit is not active then method 400 determines (at decision block 414) if a missed engine stop occurred notwithstanding the fact that the engine stop inhibit was not active. If a missed engine stop did not occur then method 400 goes back to block 408. If a missed engine stop did occur notwithstanding the fact that the engine stop inhibit was not active then method 400 commands (at block 416) the second circuit to write a first missed engine stop occurrence to memory 106 and to increment missed engine stop count. The disclosed embodiment of FIG. 2 does not show the logic flow diagram that would enable a missed engine detection to occur notwithstanding the fact that the engine stop inhibit was not active. However, in various alternative embodiments, a variety of signals comparable to ESI inhibit signal 212 may be contemplated and configured by one of ordinary skill to indicate, for example, a vehicle system fault or system condition that warrants inhibiting the engine stop functionality within an exemplary vehicle. Method 400 further includes block 418 and attempts to detect a vehicle system fault or a vehicle system condition that may have led to the missed engine stop in response to at least one of detecting the engine stop inhibit or determining that a missed engine stop occurred. Method 400 ends after executing the steps of block 418.

Figure 5:
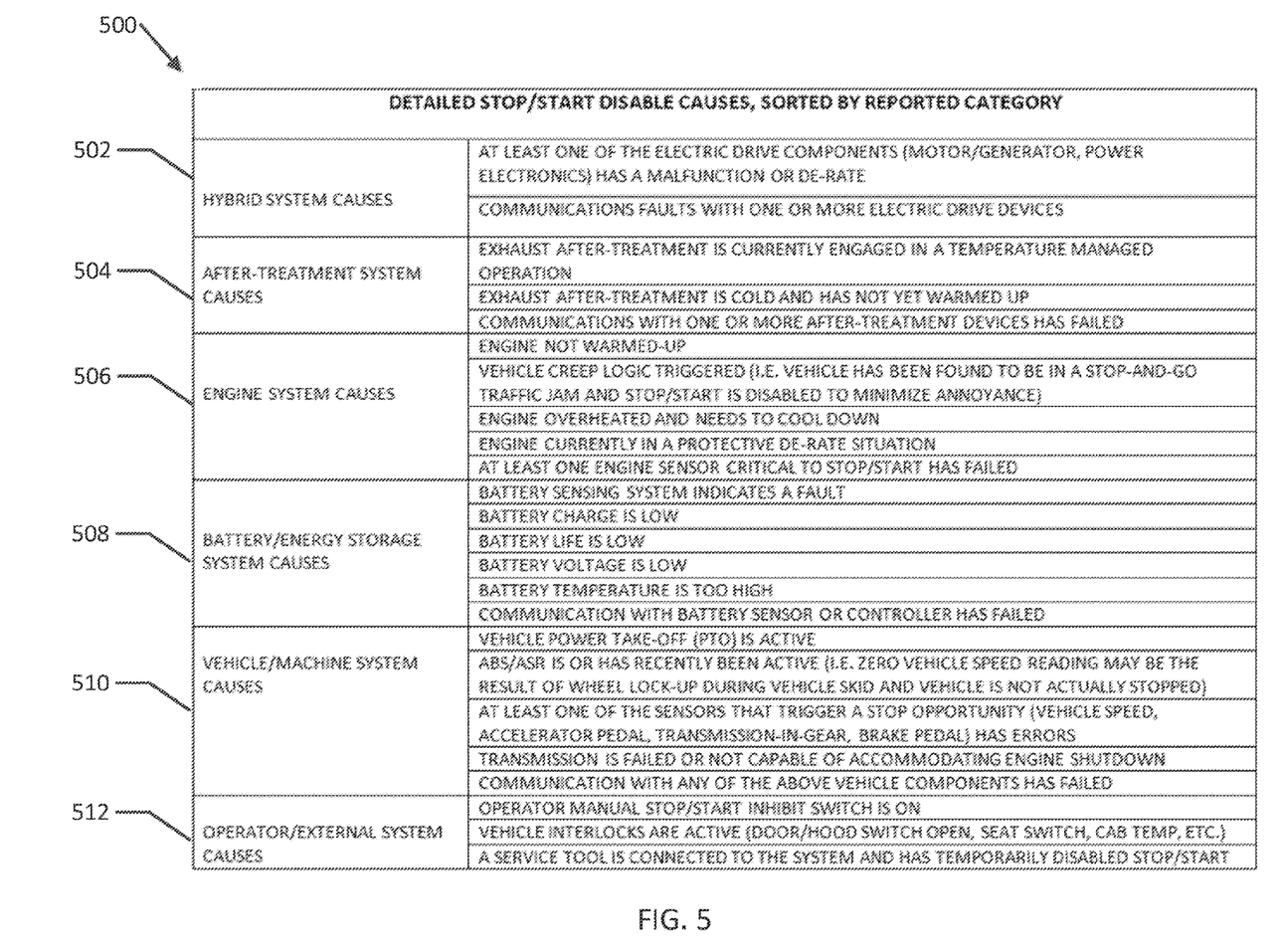
FIG. 5 shows a table comprising a plurality of stop/start disable causes according to an embodiment of the present disclosure.

FIG. 5 shows a table 500 comprising a plurality of stop/start disable causes according to an embodiment of the present disclosure. Table 500 generally includes hybrid system causes 502, after-treatment system causes 504, engine system causes 506, battery/energy storage system causes 508, vehicle/machine system causes 510, and operator/external system causes 512. As shown in the illustrative embodiment of FIG. 5, hybrid system causes 502 include ESI determiner 114 receiving one or more parameter signals indicating the following: 1) at least one of a electric drive components such as a motor/generator or power electronics has a malfunction or de-rate or 2) there is a communications faults with one or more electric drive devices. As discussed above, receiving one or more indications of certain system faults, system malfunctions, or system conditions may cause ESI determiner 114 to activate the ESI signal 212 and disable stop/start functionality within engine 116 of an exemplary vehicle. Referring again to FIG. 5, after-treatment system causes 504 include ESI determiner 114 receiving one or more parameter signals indicating the following: 1) an exhaust after-treatment device is currently engaged in a temperature managed operation; 2) the exhaust after-treatment is cold and has not yet warmed up; or 3) communications with one or more after-treatment devices has failed.

Additionally, engine system causes 506 include ESI determiner 114 receiving one or more parameter signals indicating the following: 1) engine 116 has not yet reached nominal operating temperature; 2) vehicle creep logic has been triggered, i.e., the vehicle is in a stop-and-go traffic jam and Stop/Start is disabled to minimize operator annoyance; 2) engine 116 is overheated and needs to cool down; 3) engine 116 is currently in a protective de-rate situation; or 4) at least one engine sensor critical to Stop/Start has failed. Battery/energy storage system causes 508 include ESI determiner 114 receiving one or more parameter signals indicating the following: 1) a battery sensing system indicates a fault; 2) the battery charge is below a threshold charge; 3) the remaining battery life is below a threshold level; 4) the battery voltage is below a threshold voltage; 5) the battery temperature is above a threshold temperature; or 6) communication with a battery sensor or controller 102 and a batter control system has failed.

Vehicle/machine system causes 510 include ESI determiner 114 receiving one or more parameter signals indicating the following: 1) vehicle power-take-off is active; 2) anti-lock braking system/anti-slip regulation is or has recently been active, i.e., zero vehicle speed reading may be the result of wheel lock-up during vehicle skid and the vehicle is not actually stopped; 3) at least one of the sensors that trigger an engine stop opportunity, e.g., vehicle speed sensor, throttle/accelerator pedal position sensor, brake pedal position sensor, has a can't see "fault or error" fault or error associated with it; 4) the vehicle transmission has failed or is not capable of accommodating an engine shutdown; or 5) communication with any of the above vehicle components has failed. Operator/external system causes 512 include ESI determiner 114 receiving one or more parameter signals indicating the following: 1) the operator manual Stop/Start Inhibit Switch is ON; 2) the vehicle interlocks are active, e.g., the door is open, engine access/bonnet switch is open, seat switch is active, vehicle cabin temperature management system is active; or 3) a vehicle service/diagnostics tool is coupled to the engine stop/start system and has temporarily disabled engine stop/start functionality.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative rather than a restrictive sense. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued. No claim element herein is to be construed under the provisions of 35 U.S.C. 112(f) unless the element is expressly recited using the phrase "means for."

The invention claimed is:

1. A method of diagnosing a system failure of a vehicle having an engine, comprising:
   detecting, by an engine stop opportunity determiner, an engine stop opportunity, wherein the engine stop opportunity determiner receives at least one stop opportunity signal from at least one of an engine speed sensor, a throttle or pedal position sensor, a transmission gear position sensor, a brake engaged sensor, and an engine odometer sensor;
   detecting, by an engine stop inhibit determiner, an engine stop inhibition, wherein the engine stop inhibit determiner receives at least one stop inhibit signal from a sub-system of the vehicle;
   determining, by an interpreter, that an engine stop did not occur in response to the detected engine stop opportunity, wherein the interpreter receives an input from the engine stop opportunity determiner indicating the engine stop opportunity and an input from the engine stop inhibit determiner indicating the engine stop inhibition;
   identifying, by the engine stop inhibit determiner, an engine stop inhibition reason that prevented the engine stop from occurring in response to the detected engine stop opportunity by identifying the sub-system of the vehicle emitting the at least one stop inhibit signal; and writing, to a non-volatile memory, the engine stop inhibit reason, wherein the sub-system of the vehicle includes at least one of a hybrid system, an after-treatment system, an engine system, an energy storage and battery system, or a vehicle and machine system.

2. The method of claim 1, wherein determining that an engine stop did not occur in response to the detected engine stop opportunity indicates a missed engine stop, and the method further includes incrementing a missed engine stop count in response to determining that a missed engine stop occurred.

3. The method of claim 1, further including incrementing an engine stop count in response to determining that an engine stop occurred in response to detecting the engine stop opportunity.

4. The method of claim 1, further including detecting an engine stop inhibit and incrementing an engine stop inhibition count in response to detection of the engine stop inhibit.

5. A method of diagnosing a system failure in a vehicle, comprising:
detecting, by an engine stop opportunity determiner, a first engine stop opportunity, wherein the engine stop opportunity determiner receives at least one stop opportunity signal from at least one of an engine speed sensor, a throttle or pedal position sensor, a transmission gear position sensor, a brake engaged sensor, and an engine odometer sensor;
writing, to a non-volatile memory, data corresponding to a first engine stop that occurred in response to detection of the engine stop opportunity;
detecting, by the engine stop opportunity determiner, a second engine stop opportunity;
detecting, by an engine stop inhibit determiner, an engine stop inhibition, wherein the engine stop inhibit determiner receives at least one stop inhibit signal from a sub-system of the vehicle, and one or more causes for the engine stop inhibition by identifying the sub-system of the vehicle emitting the at least one stop inhibit signal, wherein the sub-system of the vehicle includes at least one of a hybrid system, an after-treatment system, an engine system, an energy storage and battery system, a vehicle and machine system cause, or an external system cause; and
writing, to the non-volatile memory, data corresponding to a first missed engine stop wherein the first missed engine stop indicates detection of the engine stop opportunity without an engine stop in response to the detection of the engine stop opportunity.

6. The method of claim 5, further including incrementing an engine stop count in response to determining that an engine stop occurred, incrementing an engine stop inhibit count in response to detection of an engine stop inhibition, and incrementing a missed engine stop count in response to determining that a missed engine stop occurred.

7. The method of claim 5, further including writing, to the memory, data corresponding to detection of the engine stop opportunity and detection of the engine stop inhibition.

8. The method of claim 5, wherein detecting an engine stop opportunity includes detecting that the vehicle speed is below a threshold speed, a transmission of the vehicle is engaged in a gear ratio that permits movement of the vehicle, an accelerator pedal of the vehicle is not engaged, and at least one of a parking brake of the vehicle is engaged or a friction break of the vehicle is engaged.

9. The method of claim 5, further including writing, to the memory, a total number of engine stop opportunities for a first time period, a total number of engine stops for the first time period, a total number of missed engine stops for the first time period; and a total number of missed engine stops that occur in response to the engine stop inhibit and the corresponding engine stop inhibition cause.

10. The method of claim 9, wherein the memory comprises one or more non-volatile memory sectors configured to retain data while the memory is in a power down state.

11. The method of claim 5, further including determining that an engine stop occurred in response to detection of the engine stop opportunity.

12. The method of claim 5, further including determining that a missed engine stop occurred in response to detection of the engine stop opportunity and detection of the engine stop inhibit.

13. The method of claim 12, further including detecting at least one of a vehicle sub-system fault or a vehicle sub-system condition in response to at least one of detecting the engine stop inhibition or determining that a missed engine stop occurred.

14. A method of diagnosing a system failure, comprising:
commanding a first circuit to detect a first engine stop opportunity and to communicate the engine stop opportunity to a controller;
commanding a second circuit to detect an engine stop inhibition and to determine whether a missed engine stop occurred, wherein the second circuit receives at least one stop inhibit signal from a sub-system of the vehicle, and communicate the engine stop inhibition to the controller;
commanding the second circuit to write engine stop inhibition data to a non-volatile memory, the data corresponding to an occurrence of the missed engine stop; and
detecting, by the controller, a vehicle sub-system fault in response to at least one of detecting the engine stop inhibition by identifying the sub-system of the vehicle emitting the at least one stop inhibit signal, wherein the sub-system of the vehicle includes at least one of a hybrid system, an after-treatment system, an engine system, an energy storage and battery system, or a vehicle and machine system or determining that a missed engine stop occurred by detecting a failed engine stop in response to the engine stop opportunity when the second circuit fails to communicate a stop inhibit signal.

15. The method of claim 14, further including incrementing an engine stop inhibition count in response to detection of an engine stop inhibition, and incrementing a missed engine stop count in response to determining that a missed engine stop occurred.

16. The method of claim 14, further including writing, to the non-volatile memory, data corresponding to detection of the engine stop opportunity and detection of the engine stop inhibition.

17. The method of claim 14, wherein a missed engine stop indicates detection of the engine stop opportunity without an engine stop in response to the detection of the engine stop opportunity.

18. The method of claim 14, wherein the first circuit is an engine stop opportunity determiner and the second circuit is an engine stop inhibit determiner and the controller includes one or more interpreter circuits configured to detect the vehicle system fault.

19. The method of claim 14, further including commanding the first circuit to detect a second engine stop opportunity and detect an engine stop in response to the detected second engine stop opportunity.

20. The method of claim 19, further including writing, to the non-volatile memory, at least one of a total number of engine stop opportunities for a first time period, a total number of engine stops for the first time period, a total number of missed engine stops for the first time period; and a total number of missed engine stops that occur in response to the engine stop inhibit.

21. The method of claim 20, further including writing, to the non-volatile memory, a total number of engine stop inhibitions for the first time period and the corresponding engine stop inhibit cause.

22. A diagnostic apparatus comprising:
a controller including a first interface configured to receive one or more data signals that indicate an engine stop opportunity;
a second interface configured to receive one or more parameter signals that indicate an engine stop inhibition form at least one vehicle sub-system including a hybrid system, an after-treatment system, an engine system, an energy storage and battery system, or a vehicle and machine system, and an indication of the one or more causes for the engine stop inhibition, wherein the one or more causes for the engine stop inhibition include at least one of a hybrid system cause, an after-treatment system cause, an engine system cause, an energy storage and battery system cause, or a vehicle and machine system cause;
a non-volatile memory configured to store data corresponding to the engine stop opportunity, the engine stop inhibition and a missed engine stop; and
a logic configured to monitor the parameter signals and the one or more data signals, to determine that an engine stop occurred in response to the indication of an engine stop opportunity, to determine that a missed engine stop occurred in response to the indication of the engine stop opportunity, and to receive indication of the engine stop inhibition, and to identify the cause of the missed engine stop by identifying the sub-system emitting the parameter signal indicating an engine stop inhibition.

23. The diagnostic apparatus of claim 22, wherein the logic increments an engine stop count in response to determining that an engine stop occurred, increments an engine stop inhibition count in response to receiving indication of an engine stop inhibition, and increments a missed engine stop count in response to determining that a missed engine stop occurred.

24. The diagnostic apparatus of claim 22, wherein the logic is further configured to write data to the non-volatile memory, the data indicating at least one of a total number of engine stop opportunities for a first time period, a total number of engine stops for the first time period, a total number of missed engine stops for the first time period, or a total number of missed engine stops that occur in response to the engine stop inhibit.

25. The diagnostic apparatus of claim 24, wherein the logic is further configured to write data to the non-volatile memory, the data indicating a total number of engine stop inhibits for the first time period and the corresponding engine stop inhibit cause.

26. The diagnostic apparatus of claim 22, wherein the logic detects an engine stop opportunity in response to receiving one or more data signals that indicate at least one of a vehicle speed is below a threshold speed, a transmission of the vehicle is engaged in a gear ratio that permits movement of the vehicle, an accelerator pedal of the vehicle is not engaged, and at least one of a parking brake of the vehicle is engaged or a friction break of the vehicle is engaged.

27. A method of diagnosing a system failure of a vehicle having an engine, comprising:
detecting, by an engine stop opportunity determiner, an engine stop opportunity;
detecting, by an engine stop inhibit determiner, an engine stop inhibition, wherein the engine stop inhibit determiner receives a stop inhibit signal from an after-treatment system of the vehicle;
determining, by an interpreter, that an engine stop did not occur in response to the detected engine stop opportunity, wherein the interpreter receives an input from the engine stop opportunity determiner indicating the engine stop opportunity and an input from the engine stop inhibit determiner indicating the engine stop inhibition; and
writing, to a memory, the engine stop inhibition.

* * * * *